United States Patent [19]
Ross

[11] 4,440,270
[45] Apr. 3, 1984

[54] BRAKE APPARATUS

[75] Inventor: Roderick A. L. Ross, Troy, Ohio

[73] Assignee: The B. F. Goodrich Company, New York, N.Y.

[21] Appl. No.: 317,703

[22] Filed: Nov. 2, 1981

[51] Int. Cl.³ .......................................... F16D 65/853
[52] U.S. Cl. .............................. 188/264 AA; 188/71.6
[58] Field of Search .......... 188/71.6, 264 A, 264 AA, 188/264 P; 192/113 A

[56] References Cited

U.S. PATENT DOCUMENTS

| | | | |
|---|---|---|---|
| 2,955,681 | 10/1960 | Burnett | 188/264 AA X |
| 3,664,467 | 5/1972 | Lucien et al. | 188/264 AA X |
| 3,983,974 | 10/1976 | Dowell et al. | 188/264 AA |

FOREIGN PATENT DOCUMENTS 1383257 11/1964 France .......................... 188/264 AA

*Primary Examiner*—Duane A. Reger
*Attorney, Agent, or Firm*—J. Januszkiewicz

[57] ABSTRACT

A disc brake assembly for use in a vehicle having an axle rotatably journaled in an axle housing wherein a rotatable brake disc is connected to a rim support for rotation along with a tire of the vehicle. A housing is attached to said axle housing and encompasses the brake disc. Such housing has a caliper member which straddles a portion of the outer periphery of the brake disc having piston means moveable into engagement with the brake disc. Coolant means are provided to said housing for directing a flow of coolant into said closed chamber for direction against the brake disc, which is then removed via an exhaust opening to atmosphere.

8 Claims, 6 Drawing Figures

BRAKE APPARATUS

BACKGROUND OF THE INVENTION

This invention relates to brakes and more specifically to a vehicle brake of the caliper disc type construction for use in heavy duty vehicles.

In the use of heavy duty vehicles at construction sites, such vehicles encounter environmental contaminants such as dust, dirt, water, mud and other foreign matters thereby impairing and damaging the functioning of the brake system as well as their efficiency. Externally forced air cooling has been one method used to improve their efficiency wherein cooling fins or ribs are integrated into the brake shoes to provide a greater surface for dissipating the heat. Another method suggests the use of an enclosed liquid cooling system. The present invention is directed to enclosing the brake assembly and thence using forced-air cooling to effect the heat transfer. The cooling is effected by using forced clean air to remove the heat from the brake enclosure.

SUMMARY OF THE INVENTION

The present invention is directed to a caliper disc brake cooling system wherein the rotatable brake disc and its adjacent supports are fully enclosed in an air tight housing. Such housing includes the caliper member which has the moveable piston members that upon actuation operate on the braking pads or members which exert the braking force on the brake disc which action generates heat. Coolant means are provided to direct a flow of air over and around the brake disc which is then exhausted to atmosphere.

DETAILED DESCRIPTION OF THE PREFERRED EMBODIMENT

Figure 1:
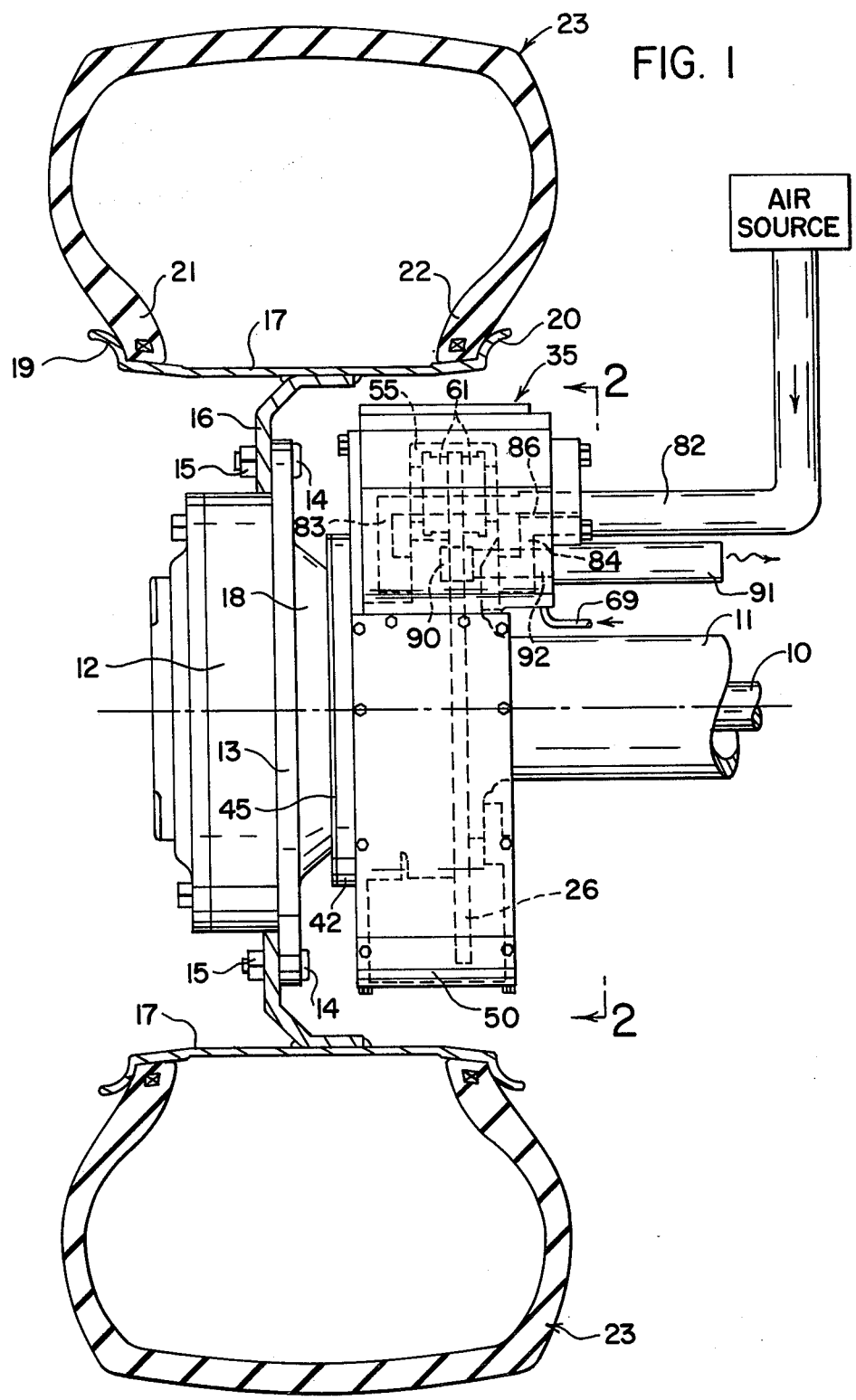
FIG. 1 is a sectional view of a disc brake assembly enclosed in a housing showing the axle and drive gear housing in full.

Referring to the drawings, wherein like reference numerals designate like or corresponding parts throughout the several views, there is shown in FIG. 1 an axle 10 that extends laterally across a vehicle covered by a stationary axle housing 11. Axle 10 drives a planetary gear unit which is located within gear housing 12. Housing 12 is a hub and rotates therewith. Housing 12 is suitably secured to an annular support or plate 13, which support or plate 13 has a conical portion 18 with a flanged portion 24. Support 13 has a plurality of circumferentially spaced bores on its outer periphery that receive bolts 14 and nuts 15 for securing a wheel flange 16 thereto. Wheel flange 16 is connected to a wheel rim 17 which has spaced rim flanges 19 and 20 for mounting beads 21 and 22 of a tire 23 thereon. Although the rim is shown as being a one piece construction for illustration purposes, such rim has generally two piece annular sections defining co-axially aligned peripheral portions for mounting the beads of a tire 23 thereon with rim flanges such as elements 19 and 20 secured on the outboard ends of the rim sections to retain the tire 23 thereon. Such rim flanges 19 and 20 extend radially outwardly from the wheel rim 17 to abut the outboard sides of the tire beads.

The flanged portion 24 of annular support 13 has a plurality of circumferentially spaced bores to provide means for attaching an annular spacer 25 thereto. Suitably secured to the spacer 25 is a brake rotor or brake disc 26 having a pair of opposed friction faces 27 and 28. Also secured to spacer 25 is an annular seal flange 30 having an annular peripheral surface 31 that will function as a sealing means in cooperation with a stationary annular seal 32 to be described.

Figure 2:
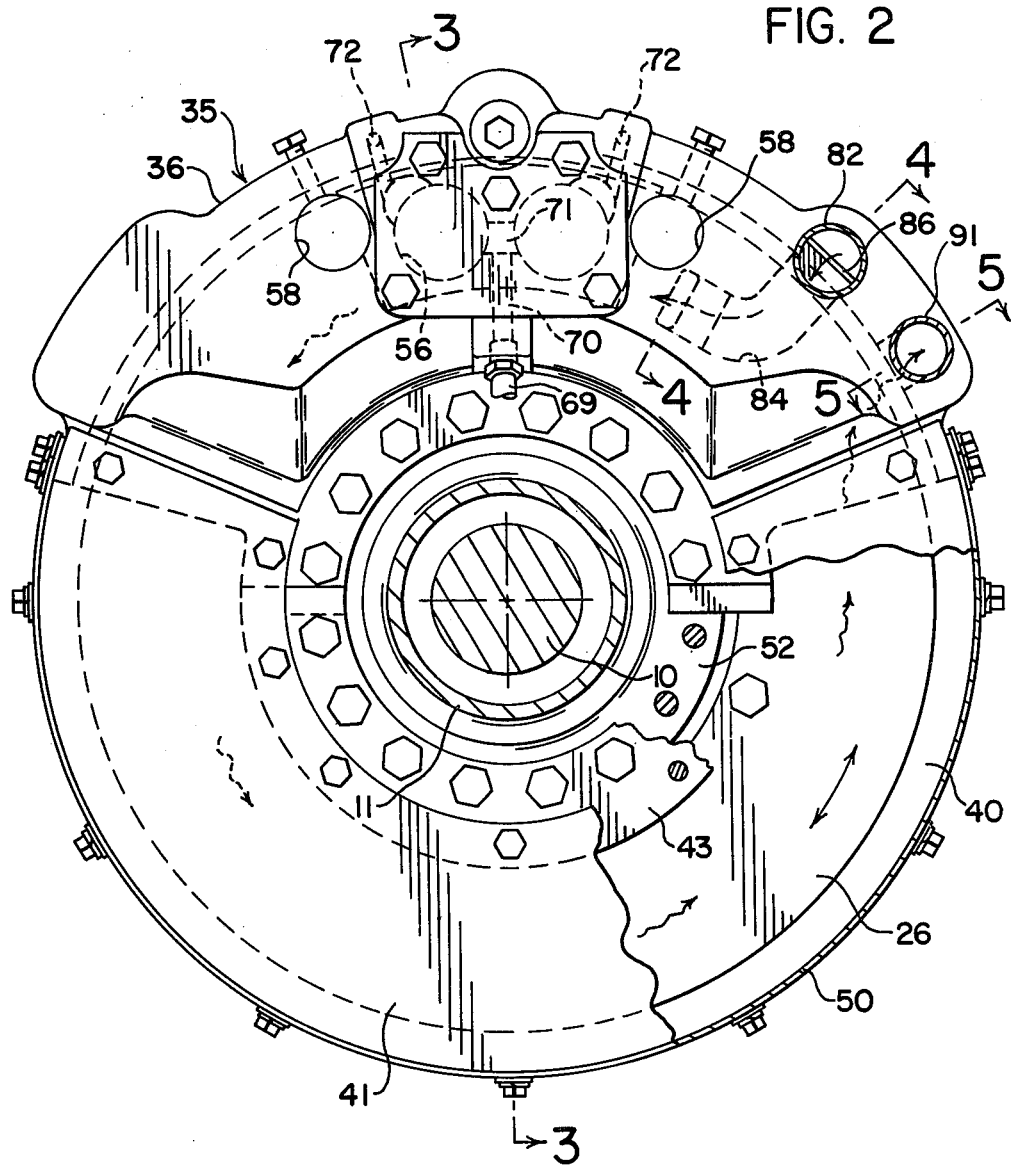
FIG. 2 is a side elevational view of the disc brake assembly taken on line 2—2 of FIG. 1 with a portion of the housing broken away.
Figure 3:
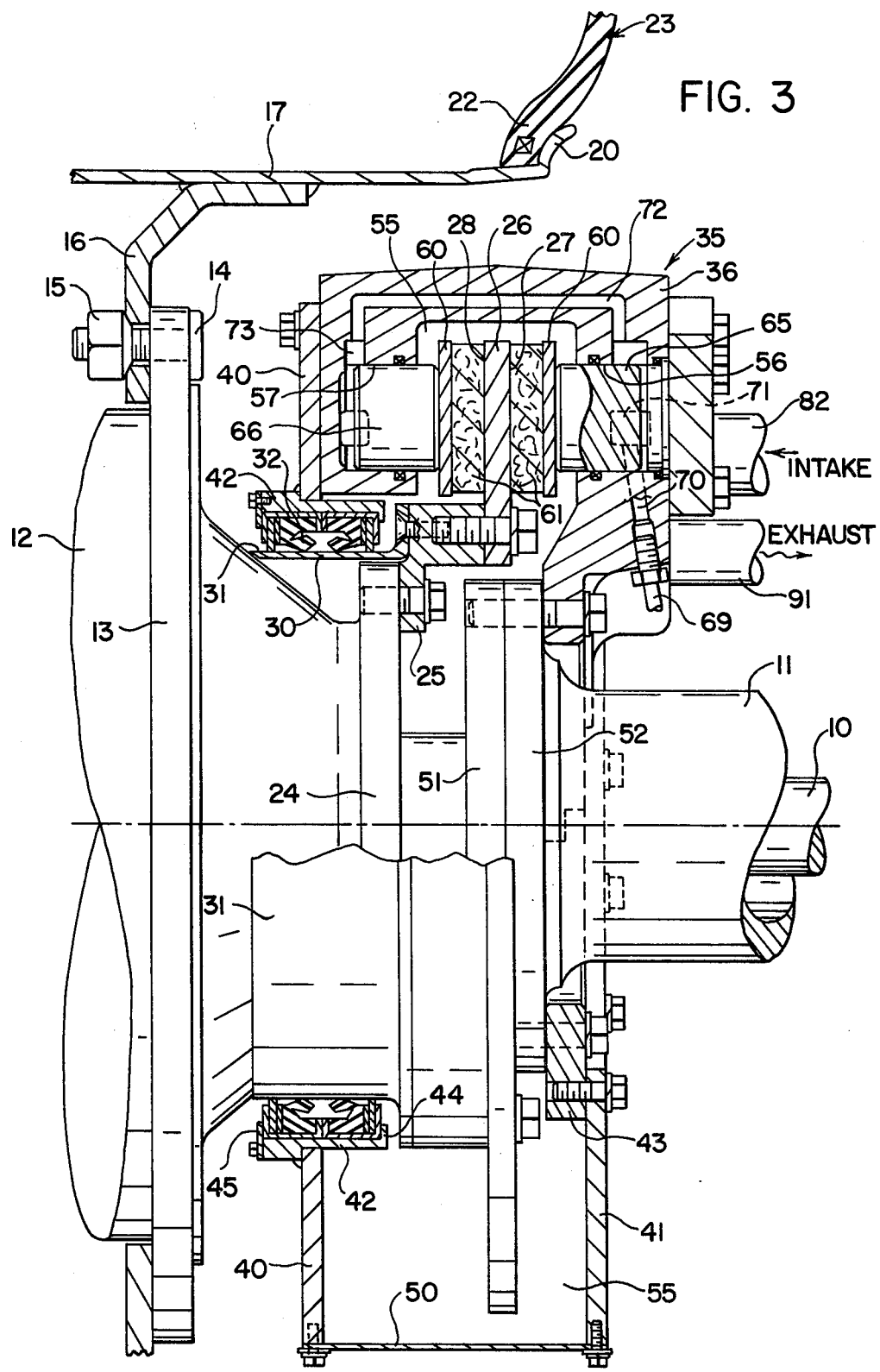
FIG. 3 is a cross sectional view of the disc brake assembly taken on line 3—3 of FIG. 2.

A caliper brake assembly 35 is mounted within the wheel well envelope of the wheel rim 17 and includes a U-shaped caliper member 36 which straddles or overlies a peripheral portion of the brake disc 26. The caliper member 36 has an annular seal retaining plate 40 attached to the outboard side thereof and a semi circular plate or adapter cover 41 along with semi circular adapter 43 secured to the inboard side thereof. A cylindrically shaped ring 42 is suitably attached to the inner periphery of annular plate 40. Located within the cylindrical ring 42 are the annular seals 32 having their inner peripheral surfaces operatively contacting the rotating surface 31 of annular seal flange 30. Annular seals 32 are retained on the cylindrical ring 42 by the inner circumferentially extending edge 44 of ring 42 and an annular plate member 45 that is secured to the outer circumferential side of ring 42. An arcuately shaped cover 50 has its respective side edges attached to the annular seal retaining plate 40 and the circular plate 41 and its respective ends attached to caliper member 36. The cover 50 cooperates with the plates 40, 41, adapter 43 and caliper member 36 to define a housing which has a closed chamber 55 that encompasses the brake disc 26 of the brake assembly. The inner periphery of adapter 43 and circular plate 41 and the inner periphery of caliper member 36 are attached to a pair of circular plates 51 and 52 which form part of the axle housing 11 to thereby assure a fully enclosed chamber 55. The caliper member 36 is rigidly fastened to flanges 51 and 52 which are members of the nonrotatable portion of the axle housing assembly thereby preventing rotation of the caliper member 36. The caliper member 36 is a generally U-shaped housing which is arcuately shaped or curved to encompass the upper portion of brake disc 26. Each side portion of the caliper member 36 has a pair of spaced bores 56-57 respectively that communicate inwardly towards the rotor or brake disc 26. Each side of the caliper member 36 has a pair of bores 58 spaced laterally of the bores 56-57, which bores 58 extend into and communicate with the chamber 55. Torque pins are located in each of the respective bores 58 to support lining carriers 60 in a manner well known in the art. Brake linings 61 are suitably secured to the lining carriers 60 and are adapted to frictionally engage the respective sides of rotor 26 to effect a braking action. Pistons 65 located in spaced bores 56 and pistons 66 located in spaced bores 57 are slidably received therein and are subject to linear movement for exerting a thrust on the carriers 60 which forces are transmitted to brake linings 61 of friction material for movement into engagement with the brake disc 26. Rearwardly of each piston 65 and 66 are chambers that are adapted to receive pressurized fluid for actuation of the pistons. A conduit 69 connects the braking fluid to a passageway 70 (FIG. 2) that communicates with a chamber 71 behind pistons 65. Chamber 71 adjacent to pistons 65 communicates with the chamber behind pistons 65 and via passageways 72 (FIG. 3) to the chamber 73 (FIG. 3) behind pistons 66. Thus, the admission of pressurized fluids into conduit 69 will pressurize the respective chambers behind pistons 65–66 which in turn will provide a force on the brake linings 61–61 which in turn are applied against the brake rotor or disc 26.

The U-shaped caliper member 36 which straddles the upper portion of the periphery of brake disc 26 has a pair of spaced inlet openings 80–81 that interconnect the central chamber 55 to an inlet conduit 82 via passageways 83 and 84 respectively. The passageways that lead to the openings 80 and 81 lie along linear lines that intersect the disc 26 at an acute angle to impart a flow of air along the opposite faces of the brake disc 26 in a counter-clockwise direction as viewed in FIG. 2.

Figure 4:
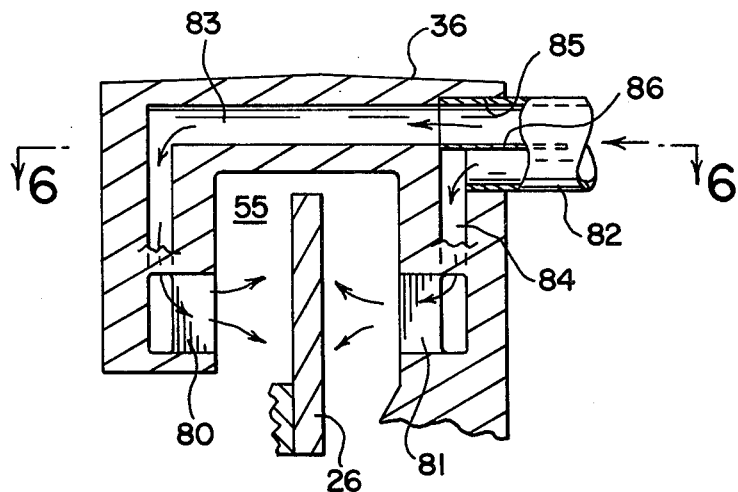
FIG. 4 is a cross sectional view of the disc brake assembly taken on line 4—4 of FIG. 2 showing a portion of the rotor and the enclosed housing.
Figure 5:
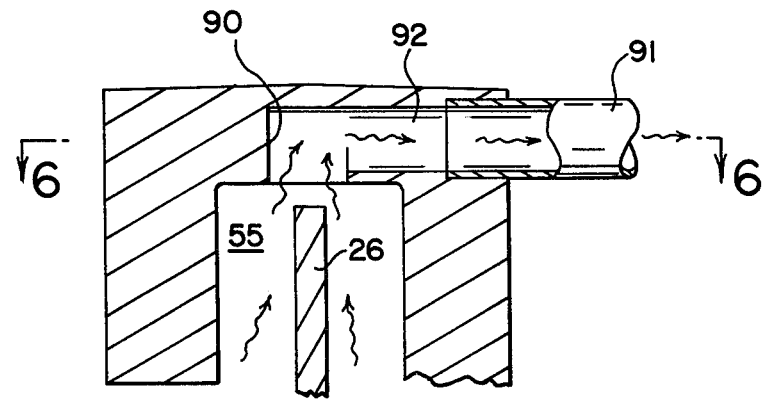
FIG. 5 is a cross sectional view of the disc brake assembly taken on line 5—5 of FIG. 2 showing the rotor and enclosed housing with the air passageways.

Conduit 82 is suitably connected to a bore 85 (FIG. 4) in such caliper member 36. A flow divider 86 is located within conduit 82 at its juncture with passageways 83 and 84 to divide the flow of air equally to such respective passageways 83 and 84. The U-shaped caliper member 36 also has a centrally disposed opening 90 interconnecting chamber 55 (FIG. 5) to an outlet or exhaust conduit 91 via passageway 92. The exhaust opening 90 is closely adjacent the air inlet openings 80 and 81 such that the forced counterclockwise rotation of air will travel substantially 360 degrees before exiting via openings 90.

The invention above described refers to a single disc 26 whereas a plurality of rotatable discs or members may be used in cooperation with a plurality of non-rotatable axially moveable braking members to provide the braking action as enclosed within the housing or chamber.

Figure 6:
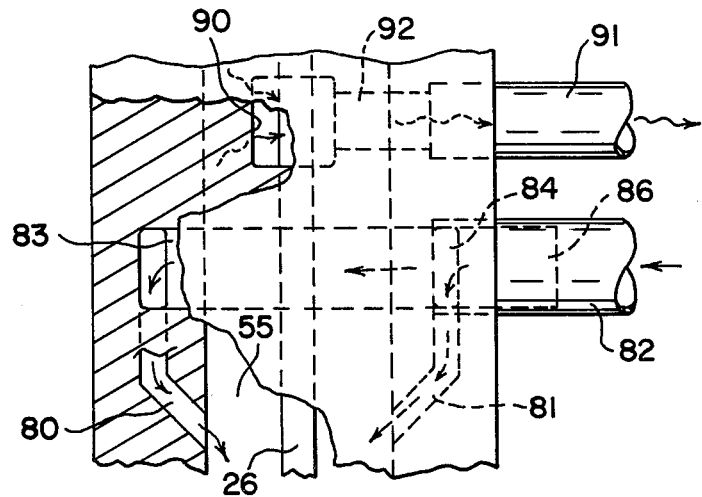
FIG. 6 is a cross sectional view with a portion in full of the disc brake assembly taken on line 6—6 of FIGS. 4 and 5.

In the operation of the described brake assembly, the power input is applied to the axle 10 in the conventional manner to rotate the tire 23. As the tire 23 rotates, rim 17 and support 13 also rotate as does the annular spacer 25 and the brake disc or discs 26. Such rotor 26 is fully confined within closed chamber 55 of brake assembly 35 as defined by the arcurately shaped cover 50, annular seal retaining plate 40, adapter cover 41, adapter 43 and caliper member 36. Chamber 55 as described above communicates with an air inlet conduit 82 which receives filtered air from a suitable source. Such source may be the surrounding contaminated air which is filtered when delivered to chamber 55, or forced air as from a fan or pressurized air. Such filtered air is delivered at a sufficient pressure that it strikes the brake disc at an angle as depicted by FIG. 6. The filtered air thence flows counterclockwise (as viewed in FIG. 2) substantially 360°, cooling the rotor and thence exiting via discharge opening 90, passageway 92 and conduit 91 to atmosphere. Such flow of filtered air (which is effected by a control means old and well known in the art) acts as a cooling medium to extract heat from the brake disc generated during the braking action when a pressurized medium is introduced behind the respective pistons 65 and 66 which then force the lining carriers 60 to push the brake linings 61 into frictional contact with the side faces of the brake rotor or disc 26. The heat generated by the frictional engagement between the rotor or disc 26 and the brake linings 61 during repeated operation of the brake is dissipated rapidly by the circumferential flow of the filtered air over the brake disc 26. Such action reduces the conduction of heat to the pistons 65 and 66 and thereby prolongs the life of the working elements and increases braking efficiency. Such system is particularly important in that it also eliminates foreign particles or foreign matter from entering the area of the brake rotor or disc which elements could seriously affect the braking action and cause increased wear and thus reduced service life of the disc 26 and brake lining 61. Such system isolates the brake area and relieves the operator's need to monitor the brake temperature and any need to provide sensing means to monitor brake rotor temperature.

Various modifications are contemplated and may obviously be resorted to by those skilled in the art without departing from the described invention, as hereinafter defined by the appended claims, as only a preferred embodiment thereof has been disclosed.

I claim:

1. In a brake assembly for use in a vehicle having vehicle wheels and a fixed axle housing; certain ones of said wheels having a rotatable support rotated by an axle; said axle located within said axle housing; said rotatable support includes an annular flange; an annular brake disc secured to said flange for rotation with said flange and said rotatable support; said annular flange having an axially extending annular seal flange secured thereto for rotation with said flange; a U-shaped caliper member overlying a portion of the periphery of said brake disc; said caliper member having an inboard side and an outboard side, a plate member interconnects said inboard side of said caliper member to said axle housing; an annular plate secured to the outboard side of said caliper member; a seal secured to the inner periphery of said annular plate member and contacts said axially extending annular seal flange to define a closed chamber between said seal, said annular plate member, said caliper member, said plate member, said axle housing and said support, said annular seal flange; braking means located on said caliper member for movement toward and away from said brake disc; actuating means on said caliper member operative for actuating said braking means for movement into frictional and braking engagement with said brake disc; conduit means connected to said chamber for directing pressurized air to said chamber to effect a flow of air therethrough to cool said brake disc; filtering means connected to said conduit means to filter the flow of air to said chamber; and an exhaust opening in said plate member on said inboard side of said caliper member for connecting said chamber with atmosphere for exhausting air from said chamber.

2. In a brake assembly as set forth in claim 1 wherein said caliper member has passageway means therethrough with one end connected to said conduit means; and said passageway means communicating with said closed chamber to direct air from said conduit means into said closed chamber for cooling said brake disc.

3. In a brake assembly as set forth in claim 2 wherein said passageway means includes a pair of channels that communicate with said closed chamber on opposite sides of said brake disc; the openings of said channels to said closed chamber is disposed at acute angles relative to the plane of said brake disc to impart an angular flow of air against said disc for movement around said brake disc around said chamber to cool said brake disc.

4. In a brake assembly as set forth in claim 3 wherein said closed chamber is a narrow cylindrical chamber encompassing said brake disc and said braking means.

5. A disc brake assembly for use in a vehicle having a vehicle wheel and an axle housing; said wheel having a rotatable support adapted to be rotated by an axle; said axle located within said axle housing; an annular brake disc secured to said support for rotation therewith and for rotation with said vehicle wheel; a U-shaped caliper member overlying a portion of the periphery of said brake disc; cover plates cooperative with said caliper member to define a closed housing member that encompasses said brake disc; said housing member being secured to said axle housing while cooperatively engaging said rotatable support to define a closed chamber within which said brake disc is rotated; brake means mounted in said caliper member for movement toward and away from said disc; actuating means connected to said brake means for actuation thereof for moving said brake means into frictional engagement with said braking disc for braking action; conduit means connected to said housing for directing pressurized air to said chamber to effect a flow of air therethrough to cool said brake disc and said brake means; an air source connected to said conduit means for directing pressurized air to said conduit, filtering means connected to air source for filtering the air flow to said conduit; said housing having an opening for exhausing air from said closed chamber; said housing member has an annular seal; and said rotatable support has an annular flange that frictionally engages said annular seal to maintain said closed chamber.

6. A brake disc assembly as set forth in claim 5 wherein said caliper member has passageway means therethrough with one end connected to said conduit means, and said passageway means having a pair of openings communicating with said closed chamber to direct air from said conduit means into said chamber for cooling said brake disc.

7. A brake disc assembly as set forth in claim 6 wherein said passageway means has a flow divider for directing the flow of air from said conduit between said pair of openings in said caliper member.

8. A braks disc assembly as set forth in claim 7 wherein said conduit means are connected to a source of pressurized air for directing such air into said passageways means for cooling said brake disc within said closed chamber and for subsequent exhaust from said exhaust opening.

* * * * *